US009145216B2

United States Patent
Gascon et al.

(10) Patent No.: US 9,145,216 B2
(45) Date of Patent: Sep. 29, 2015

(54) UNIFIED CHEMICAL ELECTRIC PROPULSION SYSTEM

(75) Inventors: Nicolas Claude Gascon, Menlo Park, CA (US); Mark Antony Cappelli, Sunnyvale, CA (US); Ronald W. King, San Francisco, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 1060 days.

(21) Appl. No.: 13/223,041

(22) Filed: Aug. 31, 2011

(65) Prior Publication Data

US 2013/0047578 A1 Feb. 28, 2013

(51) Int. Cl.
- B64G 1/40 (2006.01)
- F03H 1/00 (2006.01)
- F02K 9/72 (2006.01)
- F02K 9/94 (2006.01)

(52) U.S. Cl.
CPC .............. B64G 1/402 (2013.01); B64G 1/404 (2013.01); F02K 9/72 (2013.01); F02K 9/94 (2013.01); F03H 1/00 (2013.01); F03H 1/005 (2013.01); F03H 1/0006 (2013.01); F03H 1/0012 (2013.01); F03H 1/0043 (2013.01); F03H 1/0062 (2013.01); F03H 1/0068 (2013.01); F03H 1/0075 (2013.01)

(58) Field of Classification Search
CPC ....... F03H 1/00; F03H 1/0037; F03H 1/0081; F03H 1/0087; F03H 1/0093; F03H 1/0012; F03H 1/0006; F03H 1/0043; F03H 1/005; F03H 1/0062; F03H 1/0068; F03H 1/0075; B64G 1/40; B64G 1/402; B64G 1/405; B64G 1/406; B64G 1/404

USPC .......................................... 60/202, 203.1, 224
See application file for complete search history.

(56) References Cited

U.S. PATENT DOCUMENTS 4,069,664 A * 1/1978 Ellion et al. ................... 60/258
5,170,623 A * 12/1992 Dailey et al. .................. 60/202

(Continued)

OTHER PUBLICATIONS

Gulczinski, F., and Spores, R., "Analysis of Hall-effect thrusters and ion engines for orbit transfer missions," AIAA-96-2973, 32nd AIAA / ASME / SAE / ASEE Joint Propulsion Conference, Lake Buena Vista, FL, Jul. 1-3, 1996.*

(Continued)

*Primary Examiner* — William H Rodriguez
*Assistant Examiner* — William Breazeal
(74) *Attorney, Agent, or Firm* — Weaver Austin Villeneuve & Sampson LLP

(57) ABSTRACT

A spacecraft propulsion system has at least one chemical thruster, at least one electric thruster, a propellant supply arrangement that stores a propellant and a propellant conditioning arrangement configured to convert propellant into chemical species in a thermodynamic phase that can be readily ionized. The propellant is commonly supplied from the propellant storage device to each of the chemical thruster and the electric thruster. The chemical thruster has a gas generator and a high thrust accelerator; the electric thruster has a plasma generator and a high specific impulse accelerator. The propellant supply arrangement is configured to control flow of the propellant from the propellant supply arrangement to the gas generator and the propellant conditioning arrangement, and a first flow path connects propellant supply arrangement with the gas generator, and a second flow path connects propellant supply arrangement with the plasma generator.

13 Claims, 2 Drawing Sheets

(56) References Cited

U.S. PATENT DOCUMENTS

| | | | |
|---|---|---|---|
| 5,651,515 | A * | 7/1997 | Saccoccia et al. .......... 244/158.5 |
| 6,438,191 | B1 * | 8/2002 | Bickes et al. ................. 376/308 |
| 2004/0088910 | A1 * | 5/2004 | Van Den Berg et al. ........ 44/413 |
| 2008/0121548 | A1 * | 5/2008 | Yousefiani ................. 206/524.3 |
| 2009/0029240 | A1 * | 1/2009 | Gardner et al. ................. 429/94 |
| 2009/0148352 | A1 * | 6/2009 | Zubrin et al. ................. 422/126 |

OTHER PUBLICATIONS

Miller S., Rovey J. Progress in modeling of pre-ionization and geometric effects on a field-reversed configu-ration plasma thruster, AIAA 2009-3733. http://enu.kz/repository/2009/AIAA-2009-3733.pdf.*

Horisawa "Fundamental study on laser plasma accelerator for propulsion applications" 2002 Vacuum 65 (2002) 389-396 http://www.sciencedirect.com/science/article/pii/S0042207X0100447X.*

Lancellotti "Radiofrequency Plasma Thrusters: Modelling of Ion Cyclotron Resonance Heating and System Performance" 2007 AIAA http://www.esa.int/gsp/ACT/doc/PRO/ACT-RPR-PRO-JPC2007-TOPICA%20Vasimir%20 code%202007-5129.pdf.*

Astrium EADS Hydrazine Thrusters Jan. 11, 2011 http://cs.astrium.eads.net/sp/spacecraft-propulsion/hydrazine-thrusters/index.html.*

Astrium 1 Newton Thrusters http://cs.astrium.eads.net/sp/spacecraft-propulsion/hydrazine-thrusters/1n-thruster.html.*

Dailey "The PIT MkV Pulsed Inductive Thruster" NASA 1993 http://ntrs.nasa.gov/archive/nasa/casi.ntrs.nasa.gov/19930023164.pdf.*

J.I.E. Jordan, Electric propulsion: which one for my spacecraft? Space Systems I course at JHU, Whiting School of Engineering, Dec. 6, 2000. http://www.stsci.edu/~jordan/other/electric_propulsion_3.pdf.*

NASA Propulsion Systems http://history.nasa.gov/conghand/propulsn.htm Mar. 2010.*

Clark, The Magnetoplasmadynamic Arcjet, 1967, Pergammon Press, Astronautica Acta, vol. 13 pp. 315-325.*

Airbus Space Systems Hydrazine Thrusters—Heritage Models 10N thruster launched in 1977 http://cs.astrium.eads.net/sp/spacecraft-propulsion/hydrazine-thrusters/heritage-thrusters.html.*

Gulczinski III, F.S. and Spores, R.A., "Analysis of Hall-effect Thrusters and Ion Engines for Orbit Transfer Missions," AIAA-96-2973, 32nd AIAA / ASME / SAE / ASEE Joint Propulsion Conference, Orlando, FL, Jul. 1996.*

Pavarin, D., et al. (Sep. 2009) "Design of 50 W Helicon Plasma Thruster" IEPC-2009-205, The 31$^{st}$ International Electric Propulsion Conference, University of Michigan, Sep. 20-24, 2009, 8 pp.

Tillerson, Michael, et al. (2003) "Distributed Coordination and Control of Formation Flying Spacecraft" MIT Department of Aeronautics and Astronautics, 6 pp.

Anflo, K., et al. (Mar. 2009) "Flight Demonstration of New Thruster and Green Propellant Technology on the PRISMA Satellite", Acta Astronautica 65 (2009) pp. 1238-1249 , 12 pp.

Tahara, Hirokazu (Jul. 2003) "An Overview of Electric Propulsion Activities in Japan", The 39$^{th}$ AIAA/ASME/SAE/ASEE Joint Propulsion Conference and Exhibit Jul. 20-23, 2003, Huntsville, Alabama, 25 pp.

Saccoccia, G., et al. (Feb. 2000) "Electric Propulsion: A Key Technology for Space Missions in the New Millennium", Electric Propulsion Section, ESA Directorate for Technical and Operational Support, ESTEC, Noordwijk, The Netherlands, ESA Bulletin 101, Feb. 2000, 10 pp.

Kuninaka, Hitoshi, et al. (Sep. 2007) "Re-ignition of Microwave Discharge Ion Engines on Hayabusa for Homeward Journey", IEPC-2007-9, The 30$^{th}$ International Electric Propulsion Conference, Florence, Italy, Sep. 17-20, 2007, 6 pp.

Killinger, Rainer, et al. (2001) "Results of the 15000 Hours Lifetime Test for the RITA Ion Propulsion on ESA's ARTEMIS Satellite", IEPC-01-082, Astrium GmbH, Munchen, Germany, 10 pp.

Corey, Ronald L., et al. (Sep. 2009) "Electric Propulsion at Space Systems/Loral", IEPC-2009-270, The 31$^{st}$ International Electric Propulsion Conference, University of Michgan, Ann Arbor, Michigan, Sep. 20-24, 2009, 17 pp.

Anflo, K., et al. (Jun. 2004) "Development Testing of 1-Newton ADN-Based Rocket Engines", Proceedings of the 2$^{nd}$ International Conference on Green Propellants for Space Propulsion ESA SP-557, Chia Laguna (Cagliara), Sardinia, Italy, Jun. 7-8, 2004, 4 pp.

Kounalakis, M.E., et al. (1988) "Combustion of HAN-based Liquid Monopropellants Near the Thermodynamic Critical Point", Combustion and Flame, vol. 74, Issue 2, pp. 179-192, 14 pp.

Hong, I.S., et al. (Mar. 2000) "Ion-beam Characteristics of Novel Helicon Ion Sources for Different Plasma Parameters", Review of Scientific Instruments, vol. 1, No. 3, pp. 1385-1388, 4 pp.

Feili, D., et al. (2009) "µNRIT-2.5—A New Optimized Microthruster of Giessen University", IEPC-2009-174, American Institute of Aeronautics and Astronautics, 9 pp.

Squire, Jared P., et al. (Sep. 2009) "Superconducting 200 kW VASIMR Experiment and Integrated Testing", IEPC-2009-209, The 31$^{st}$ International Electric Propulsion Conference, University of Michigan, Ann Arbor, Michigan, Sep. 20-24, 2009, 8 pp.

Kirtley, David, et al. (2005) "Details on an Annular Field Reversed Configuration Plasma Device for Spacecraft Propulsion" IEPC-2005-171, University of Michigan, Ann Arbor, Michigan, 9 pp.

Frisbee, Robert H., et al. (Jul. 2005) "The Nuclear-Electric Pulsed Inductive Thruster (NuPIT): Mission Analysis for Prometheus", 41$^{st}$ AIAA/ASME/SAE/ASEE Joint Propulsion Conference and Exhibit, Tucson, Arizona, Jul. 10-13, 2005, 20 pp.

Squire, J.P., et al. (2000) "Helicon Plasma Injector and Ion Cyclotron Acceleration Development in the VASIMR Experiment", AIAA-2000-3752, 36$^{th}$ AIAA/ASME/SAE/ASEE Joint Propulsion Conference, Huntsville, Alabama, Jul. 17-19, 2000, 8 pp.

Toki, Kyoichiro, et al. (2009) "Plasma Acceleration in a Compact Helicon Source Using RF Antennae", The Japan Society of Plasma Science and Nuclear Fusion Research Series, vol. 8, 2009, pp. 25-30, 6 pp.

Slough, John, et al. (Sep. 2009) "Pulsed Plasmoid Propulsion: The ELF Thruster", IEPC-2009-265, The 31$^{st}$ International Electric Propulsion Conference, Ann Arbor, Michigan, Sep. 20-24, 2009, 24 pp.

* cited by examiner

UNIFIED CHEMICAL ELECTRIC PROPULSION SYSTEM

TECHNICAL FIELD

This invention relates generally to a spacecraft propulsion system, and particularly to a unified chemical electric propulsion system having a single propellant used by both a chemical thruster and an electrostatic or electromagnetic thruster.

BACKGROUND OF THE INVENTION

Spacecraft propulsion systems generally include thrusters, which may be broadly categorized as either "chemical" or "electric" based on the respective primary energy source.

Chemical thrusters, whether the propellant is solid or liquid, monopropellant or bipropellant, deliver thrust by converting chemical energy stored in the propellant to kinetic energy delivered to combustion products of the chemical propellant. Chemical thrusters, as the term is used herein, and in the claims, also include electrothermal thrusters such as arcjets, described for example in U.S. Pat. Nos. 5,485,721 and 5,819,526, that are configured to use electrical energy to increase the temperature, and, therefore, the velocity of the combustion products of chemical propellants.

In contrast, an electric thruster, as the term is used herein, and in the claims, converts electrical energy to propellant kinetic energy substantially without regard to any chemical energy the propellant may possess. For example, an electric thruster may operate by ionizing and accelerating a gaseous propellant, where the propellant is a noble gas of a heavy element, such as xenon or argon. Irrespective of the selected propellant, a negligible amount of thrust results from energy chemically stored in the propellant. The term electric thruster, as used herein and in the claims, encompasses an electrostatic thruster, an electromagnetic thruster, a Hall effect thruster, a wakefield accelerator, and a traveling wave accelerator, for example.

Chemical thrusters suitable for spacecraft propulsion systems may deliver relatively high thrust of 10-1000 newtons, for example, substantially irrespective of spacecraft power limitations, but such thrusters are generally incapable of operating at a specific impulse ($I_{sp}$) higher than 500 seconds. Electric thrusters may operate at an $I_{sp}$ of 1000-4000 seconds, but spacecraft power constraints, at least, practically constrain thrust levels to well less than one newton.

During the course of a typical spacecraft mission there are times that a high thrust, low power thruster is desirable; at other times, however, a high $I_{sp}$ thruster is more advantageous. As a result, it is known, as illustrated in FIG. 1, to provide both chemical and electric thrusters on board a single spacecraft, each thruster assigned to a propulsion subsystem having its own dedicated propellants and its own dedicated propellant supply arrangements.

SUMMARY OF INVENTION

The present inventors have appreciated that a unified spacecraft propulsion system having one or more chemical thrusters and one or more electric thrusters may, advantageously, operate with a single, common, propellant.

Advantageously, the system offers a wide range of thrust and $I_{sp}$, while avoiding the overhead penalty of requiring separate, dedicated propellants and propellant supply arrangements for each of two types of propellants.

In an embodiment, a spacecraft propulsion system includes at least one chemical thruster, having a gas generator and a high thrust accelerator and at least one electric thruster, having a plasma generator and a high specific impulse (Isp) accelerator. The spacecraft propulsion system includes a propellant supply arrangement that stores a propellant; and at least one propellant conditioning arrangement, disposed between the propellant supply arrangement and the at least one plasma generator. The propellant condition arrangement is configured to receive propellant from the propellant supply arrangement and convert the received propellant into one or more selected chemical species in a thermodynamic phase, the selected chemical species in the thermodynamic phase being readily ionizable. The propellant supply arrangement is configured to control flow of the propellant from the propellant supply arrangement to the gas generator and the propellant conditioning arrangement; and a first flow path connects the propellant supply arrangement with the gas generator, and a second flow path connects the propellant supply arrangement with the plasma generator.

In another embodiment the propellant may be of a type selected from the group consisting of solid, liquid monopropellant, liquid bipropellant.

In a further embodiment, the propellant is selected from the group consisting of hydroxylammonium nitrate ($H_4N_2O_4$), hydrogen peroxide, ammonium dinitramide ($H_4N_4O_4$), nitrous oxide, and water.

In another embodiment, the chemical thruster may operable to deliver at least one newton of thrust In a yet further embodiment the electric thruster may be configured to deliver a specific impulse of at least 500 seconds and be of a type selected from the group consisting of: a Hall accelerator, a gridded electrostatic accelerator, a cross field (E×B) accelerator, a pulsed plasma thruster, a pulsed inductive thruster, a field-reversed configuration plasma thruster, a wakefield accelerator, a traveling wave accelerator, and an ion cyclotron resonance heater combined with a magnetic nozzle.

In an embodiment, the gas generator may be of a type selected from the group consisting of: a catalytic device, an electric heater, and a combustion chamber.

In another embodiment, the propellant supply arrangement may be configured to direct the propellant through a selectable one of the first flow path and the second flow path.

In a further embodiment, the system may also include a power conditioning arrangement that tailors an input power from a spacecraft electric power supply to the requirements of the chemical thruster and the electric thruster.

In an embodiment, a propulsion system includes at least one chemical thruster, at least one electric thruster, of a type selected from the group consisting of: a Hall accelerator, a gridded electrostatic accelerator, a cross field (E×B) accelerator, a pulsed plasma thruster, a pulsed inductive thruster, a field-reversed configuration plasma thruster, a wakefield accelerator, a traveling wave accelerator, and an ion cyclotron resonance heater combined with a magnetic nozzle; and a propellant supply arrangement that stores a propellant. The propellant is commonly supplied from the propellant supply arrangement to each of the chemical thruster and the electric thruster.

In an embodiment, the chemical thruster may include a gas generator and a high thrust accelerator; the electric thruster, may include a plasma generator and a high specific impulse (Isp) accelerator. A propellant conditioning arrangement may be disposed between the propellant supply arrangement and the plasma generator, configured to receive propellant from the propellant supply arrangement and convert the received propellant into one or more selected chemical species in a thermodynamic phase, the selected chemical species in the thermodynamic phase being readily ionizable. The propellant supply arrangement may be configured to control flow of the propellant from the propellant supply arrangement to the gas generator and the propellant conditioning arrangement; and a first flow path may connects propellant supply arrangement with the gas generator, and a second flow path may connect propellant supply arrangement with the plasma generator.

BRIEF DESCRIPTION OF THE DRAWINGS

Features of the invention are more fully disclosed in the following detailed description of the preferred embodiments, reference being had to the accompanying drawings, in which.

Figure 1:
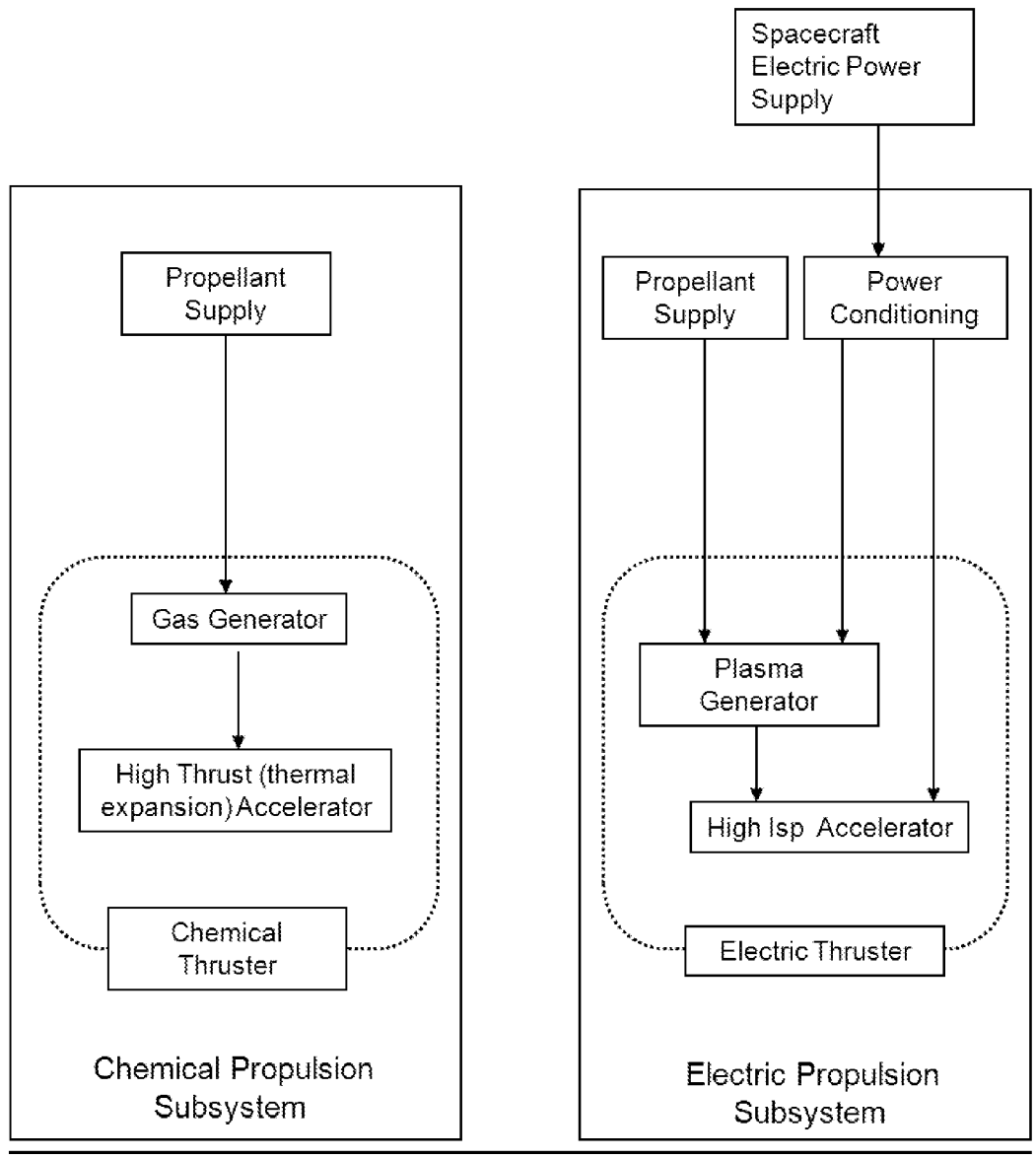
FIG. 1 illustrates an example of chemical and electric propulsion subsystems of the prior art.

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the subject invention as defined by the appended claims.

DETAILED DESCRIPTION

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "connected" or "coupled" to another element, it can be directly connected or coupled to the other element, or intervening elements may be present. Furthermore, "connected" or "coupled" as used herein may include wirelessly connected or coupled. It will be understood that although the terms "first" and "second" are used herein to describe various elements, these elements should not be limited by these terms. These terms are used only to distinguish one element from another element. Thus, for example, a first user terminal could be termed a second user terminal, and similarly, a second user terminal may be termed a first user terminal without departing from the teachings of the present invention. As used herein, the term "and/or" includes any and all combinations of one or more of the associated listed items. The symbol "/" is also used as a shorthand notation for "and/or".

The terms "spacecraft", "satellite" and "vehicle" may be used interchangeably herein, and generally refer to any orbiting satellite, interplanetary vehicle, or spacecraft system.

The present inventors have appreciated that a unified spacecraft propulsion system having one or more chemical thrusters and one or more electric thrusters may, advantageously, operate with a single, common, propellant. Advantageously, the system offers a wide range of thrust and $I_{sp}$, while avoiding a need for a separate, dedicated propellant supply arrangements for each of two types of propellants.

Other benefits of the techniques described hereinbelow include (1) increased payload to total vehicle mass ratio, (2) increased payload volume and mounting space, (3) reduction in manufacturing, testing and ground operation costs, (4) fewer mission and ground operation risks and failure mechanisms.

As a result of the above mentioned benefits, more challenging satellite mission objectives may be enabled by the unified propulsion system, including, for example, multiple rapid repositioning of telecommunication satellites in geosynchronous orbit, large altitude and inclination changes for observation satellites in low earth orbit, debris avoidance, evasive maneuvers, formation flying to enable fractionated space vehicles, as well as more efficient interplanetary missions.

Figure 2:
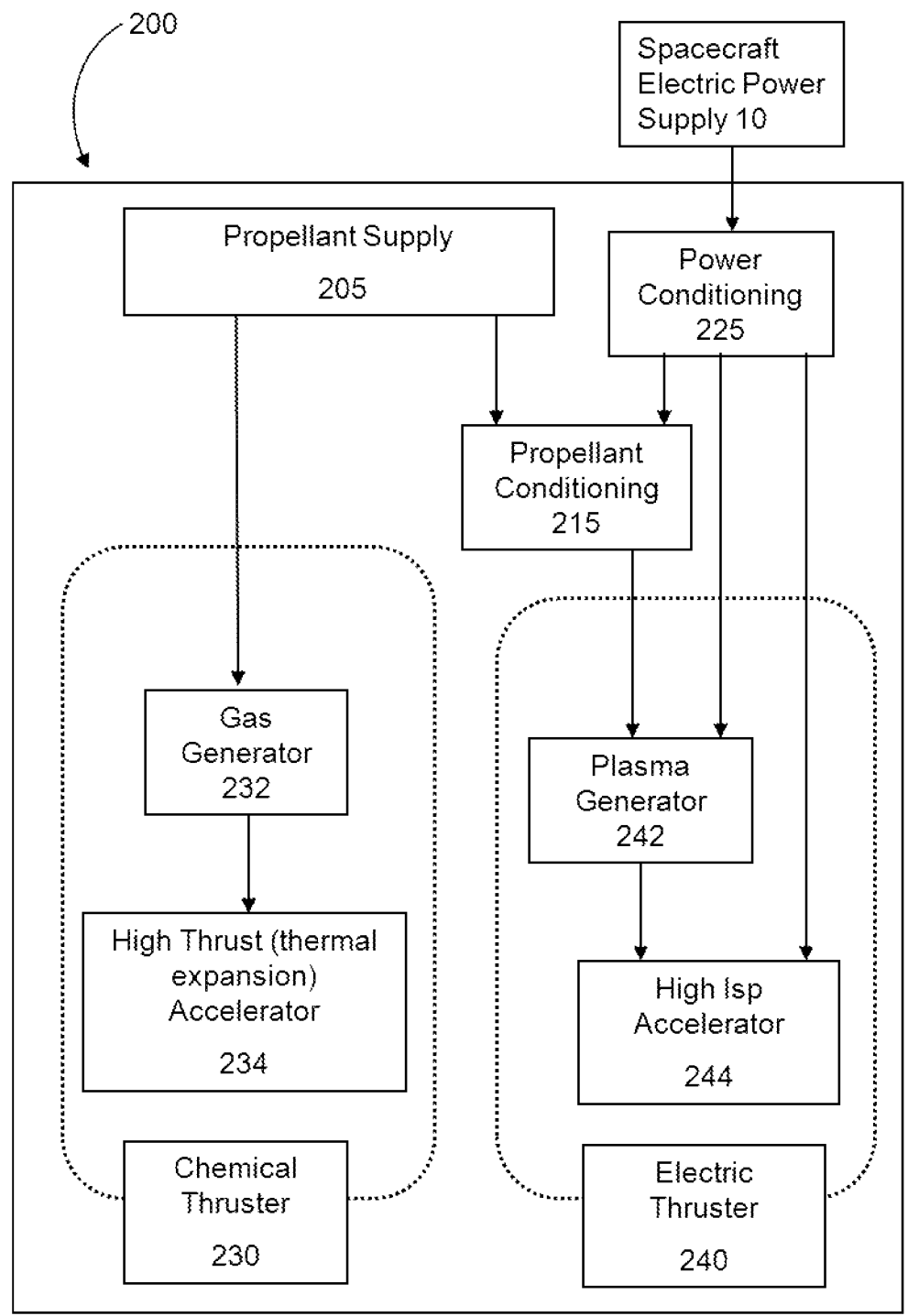
FIG. 2 illustrates a block diagram of an embodiment of a unified chemical electric propulsion system.

In an embodiment, referring now to FIG. 2, a propulsion system 200 may include a common propellant supply arrangement 205 that may be configured to operate with either or both of a chemical thruster 230 and an electric thruster 240. It will be understood that, although only one each chemical thruster 230 and electric thruster 240 are illustrated for sake of clarity, a spacecraft propulsion system may have more than one of each type of device.

Propellant supply arrangement 205 may include one or more propellant tanks, or plenums, wherein a propellant is stored, and an arrangement of valves, regulators, filters and other propellant management and servicing devices. The propellant may be a liquid propellant, and propellant supply arrangement 205 may also include devices for storing and/or regulating a pressurant, such as helium, for example. The propellant may be a monopropellant such as hydrazine, for example. In an embodiment, the propellant is a bipropellant, and propellant storage arrangement 205 may include at least two plenums, and provide separate storage for each of a fuel and an oxidizer. In an embodiment, the propellant may be a solid propellant. Advantageously, the propellant may be a low-toxicity, "green" propellant, such as HAN (hydroxylammonium nitrate, $H_4N_2O_4$), hydrogen peroxide, ADN (ammonium dinitramide, $H_4N_4O_4$), nitrous oxide or water, for example.

Propellant supply arrangement 205 may be configured to provide for control and monitoring of propellant flow rates and pressures, and provide, for example, service means for propellant loading and propulsion system testing. Moreover, propellant supply arrangement 205 may provide for selection and isolation of one or more chemical or electric thrusters. Advantageously, propellant supply arrangement 205 is configured to selectably control propellant flow rate, depending on thrust level desired, and type of thruster to be operated. For example, when the type of thruster to be operated is electric thruster 240, an appropriate propellant flow rate may be an order of magnitude or more lower than a propellant flow rate appropriate for operation of chemical thruster 230.

Propellant conditioning arrangement 215 may be configured to convert the common propellant into chemical species in a thermodynamic phase that can be readily ionized to generate a plasma in an electric thruster. In an embodiment, a gas filtering element (not shown) may be disposed between propellant conditioning arrangement 215 and plasma generator 242. The gas filtering element may, for example, be configured to filter chemical species output from propellant conditioning arrangement 215, so that only selected species reach plasma generator 242. Advantageously, for example, molecular and/or atomic species that are most appropriate for dissociation and ionization, and/or plasma acceleration may be selected.

Power conditioning arrangement 225 may be configured to tailor an input power from the spacecraft electric power supply 10 to the requirements of the propulsion system. In an embodiment, for example, input power from the spacecraft electric power supply may be provided at a single regulated or unregulated DC voltage. Electric thruster 240 and propellant conditioning arrangement 215 may require AC and/or DC power inputs having a variety of regulation, voltage and current requirements. In an embodiment, power conditioning arrangement 225 may be configured to provide an appropriately tailored output to electric thruster 240 propellant conditioning arrangement 215. In an embodiment, valving associated with chemical thruster 230 and other components of propulsion system 200 may require various low-voltage power inputs, and, in an embodiment, power conditioning arrangement 225 may also be configured to provide an appropriate output to such components.

In an embodiment, chemical thruster 230 may consist of gas generator 232 and high thrust accelerator 234. Gas generator 232 may include, for example, a catalytic device for decomposing a monopropellant, an electric heater, and/or a combustion chamber wherein a fuel and oxidizer are combusted. High thrust accelerator 234, in an embodiment, may be a nozzle configured to receive and expand the combustion products from gas generator 232 to produce thrust. It will be understood that gas generator 232 and high thrust accelerator 234 may be elements of an integrated device, or separately arranged.

In an embodiment, electric thruster 240 may consist of plasma generator 242 and a high Isp accelerator 244. It will be understood that plasma generator 242 and accelerator 244 may be elements of an integrated device, or separately arranged. Electric thruster 240 may be configured, for example, as a closed drift, electron accelerator (Hall accelerator), a gridded electrostatic accelerator, a cross field (E×B) accelerator, a pulsed plasma thruster, a pulsed inductive thruster, a field-reversed configuration plasma thruster, a wakefield accelerator, a traveling wave accelerator, or an ion cyclotron resonance heater combined with a magnetic nozzle.

Plasma generator 242 may include, for example, an arrangement configured to ionize chemical species received from propellant conditioning arrangement 215. The chemical species are anticipated to include, for example, hydrogen, oxygen, nitrogen, carbon, and water, having an atomic mass and ionization efficiency indicated in Table I. In an embodiment, plasma generator 242 may be configured to effect molecular species dissociation on the chemical species and to ionize atomic species. Plasma may be produced, in an embodiment, by electron bombardment, resulting from an electrical discharge between a cathode and an anode. In other embodiments, a radio frequency (RF) or helicon discharge may be employed to generate a plasma. Advantageously, plasma generator 242 may be configured to operate efficiently over a wide range of electric power settings and with multiple types of propellants by, for example, tuning a magnetic field and/or a power matching network.

TABLE I

| Combustion Product | Atomic Mass (AMU) | Ionization Efficiency (eV) |
|---|---|---|
| $H_2$ | 2.016 | 13.6 |
| $O_2$ | 31.98 | 13.6 |
| $N_2$ | 28.02 | 14.5 |
| $H_2O$ | 18.01 | 32.2 |
| C | 12.01 | 11.3 |

Accelerator 244 may be configured to accelerate ionized plasma species produced by plasma generator 242. For example, accelerator 244 may employ steady or unsteady electric and magnetic fields, generated by electrodes, magnets, and/or RF antennas to produce an electromagnetic field that accelerates ions produced by plasma generator 242 to a high exhaust velocity. Advantageously, accelerator 244 may induce an ion exhaust velocity of 10,000 meters per second or greater.

Thus, a unified chemical electric propulsion system has been disclosed.

The foregoing merely illustrates principles of the invention. It will thus be appreciated that those skilled in the art will be able to devise numerous systems and methods which, although not explicitly shown or described herein, embody said principles of the invention and are thus within the spirit and scope of the invention as defined by the following claims.

What is claimed is:

1. A spacecraft propulsion system comprising:
    at least one chemical thruster, including a gas generator and a high thrust accelerator, the at least one chemical thruster configured to deliver at least 10 newtons of thrust;
    at least one electric thruster, including a plasma generator and a high specific impulse (Isp) accelerator, the at least one electric thruster being of a type selected from the group consisting of: a Hall accelerator, a gridded electrostatic accelerator, a pulsed plasma thruster, a pulsed inductive thruster, a field-reversed configuration plasma thruster, a wakefield accelerator, a traveling wave accelerator, and an ion cyclotron resonance heater combined with a magnetic nozzle;
    a propellant supply arrangement that stores a propellant; and
    at least one propellant conditioning arrangement, disposed between the propellant supply arrangement and the at least one electric thruster, and not between the propellant supply arrangement and the at least one chemical thruster, the propellant conditioning arrangement configured to receive propellant from the propellant supply arrangement and convert the received propellant into one or more selected chemical species in a thermodynamic phase;
    wherein the propellant supply arrangement is configured to selectably control flow rate of the propellant from the propellant supply arrangement to a selectable one of the gas generator and the propellant conditioning arrangement, appropriate to a type of thruster selected to be operated and to provide for selection and isolation of the at least one chemical thruster and the at least one electric thruster; and
    a first flow path connects the propellant supply arrangement with the gas generator, and a second flow path connects the propellant supply arrangement with the plasma generator.

2. The spacecraft propulsion system of claim 1, wherein the propellant is of a type selected from the group consisting of solid, liquid monopropellant, liquid bipropellant.

3. The spacecraft propulsion system of claim 1, wherein the propellant is selected from the group consisting of hydroxylammonium nitrate (H4N2O4), hydrogen peroxide, ammonium dinitramide (H4N4O4), nitrous oxide, and water.

4. The spacecraft propulsion system of claim 1, wherein the gas generator is of a type selected from the group consisting of: a catalytic device, an electric heater, and a combustion chamber.

5. The spacecraft propulsion system of claim 1, wherein the propellant supply arrangement is configured to direct the propellant through a selectable one of the first flow path and the second flow path.

6. The spacecraft propulsion system of claim 1, wherein the system further comprises a power conditioning arrangement that tailors an input power from a spacecraft electric power supply to the requirements of the at least one chemical thruster and the at least one electric thruster.

7. A propulsion system comprising:
at least one chemical thruster;
at least one electric thruster, of a type selected from the group consisting of: a Hall accelerator, a gridded electrostatic accelerator, a pulsed plasma thruster, a pulsed inductive thruster, a field-reversed configuration plasma thruster, a wakefield accelerator, a traveling wave accelerator, and an ion cyclotron resonance heater combined with a magnetic nozzle;
a propellant supply arrangement that stores a propellant; and
a propellant conditioning arrangement disposed between the propellant supply arrangement and the at least one electric thruster, and not between the propellant supply arrangement and the at least one chemical thruster, the propellant conditioning arrangement configured to convert propellant into chemical species in a thermodynamic phase; wherein
the propellant is commonly supplied from the propellant supply arrangement to each of the at least one chemical thruster and the at least one electric thruster; and
the propellant supply arrangement is configured to selectably control flow rate of the propellant from the propellant supply arrangement to a selectable one of the at least one chemical thruster and the propellant conditioning arrangement, appropriate to a type of thruster selected to be operated and to provide for selection and isolation of the at least one chemical thruster and the at least one electric thruster.

8. The propulsion system of claim 7, wherein:
the at least one chemical thruster comprises a gas generator and a high thrust accelerator;
the at least one electric thruster, comprises a plasma generator and a high specific impulse (Isp) accelerator; and
a first flow path connects the propellant supply arrangement with the gas generator, and a second flow path connects the propellant supply arrangement with the plasma generator.

9. The propulsion system of claim 8, wherein the propellant is of a type selected from the group consisting of solid, liquid monopropellant, liquid bipropellant.

10. The propulsion system of claim 8, wherein the propellant is selected from the group consisting of hydroxylammonium nitrate (H4N2O4), hydrogen peroxide, ammonium dinitramide (H4N4O4), nitrous oxide, and water.

11. The propulsion system of claim 8, wherein the gas generator is of a type selected from the group consisting of: a catalytic device, an electric heater, and a combustion chamber.

12. The propulsion system of claim 8, wherein the propellant supply arrangement is configured to direct the propellant through a selectable one of the first flow path and the second flow path.

13. The propulsion system of claim 8, wherein the system further comprises a power conditioning arrangement that tailors an input power from a spacecraft electric power supply to the requirements of the at least one chemical thruster and the at least one electric thruster.

* * * * *